(No Model.)
R. J. WALKER.
CLOTH TENTERING MACHINE.
No. 552,021. Patented Dec. 24, 1895.
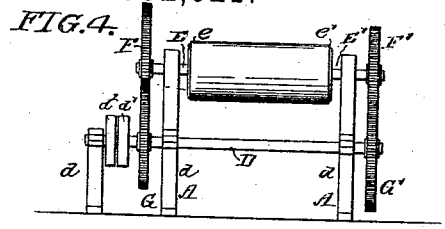
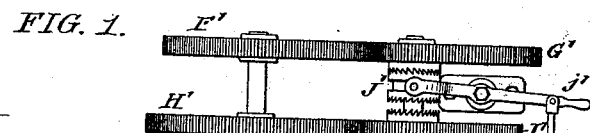
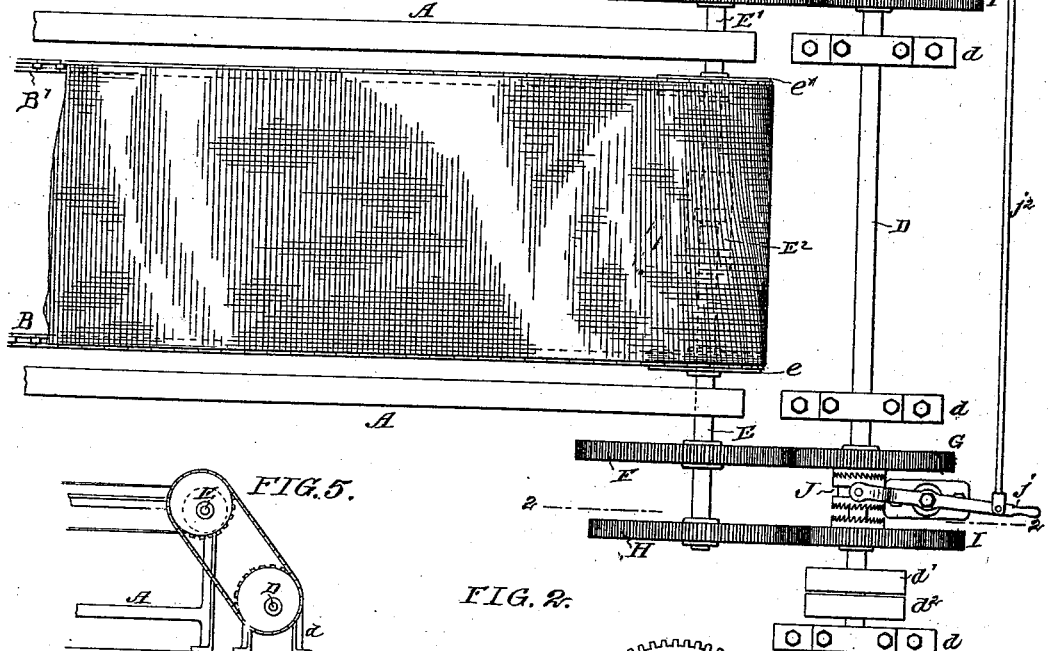
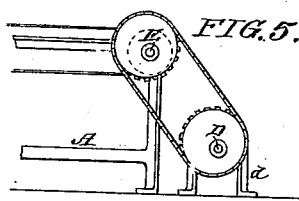
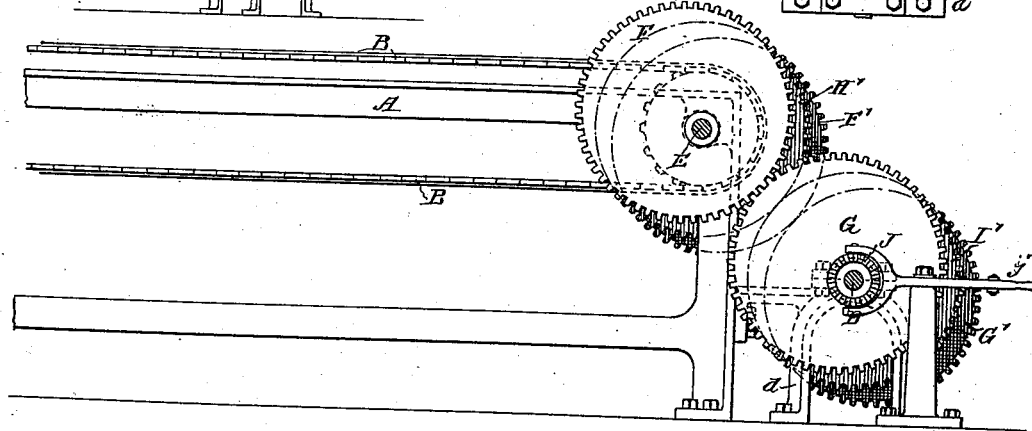
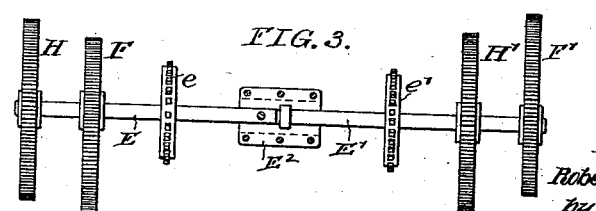
Witnesses:
Inventor:
Robert J. Walker
by his Attorneys
Howson & Howson

UNITED STATES PATENT OFFICE.

ROBERT J. WALKER, OF PHILADELPHIA, PENNSYLVANIA.

CLOTH-TENTERING MACHINE.

SPECIFICATION forming part of Letters Patent No. 552,021, dated December 24, 1895.

Application filed April 30, 1895. Serial No. 547,695. (No model.)

*To all whom it may concern:*

Be it known that I, ROBERT J. WALKER, a citizen of the United States, residing in Philadelphia, Pennsylvania, have invented certain Improvements in Cloth-Tentering Machines, of which the following is a specification.

The object of my invention is to so construct a machine for tentering or stretching cloth and other fabrics that the shafting can be arranged in fixed bearings and the drawing motion may be imparted through either plain or eccentric gears. This object I attain in the following manner, reference being had to the accompanying drawings, in which—

Figure 1 is a plan view of sufficient of a tentering-machine to illustrate my invention. Fig. 2 is a side view, partly in section, on the line 2 2, Fig. 1. Fig. 3 is a detached view of the chain-shaft. Fig. 4 is a front view of a machine, illustrating the eccentric gearing. Fig. 5 is a view of a modification.

A is the frame of a tentering-machine.

B B' are the belts or chains, one at each side of the machine and adapted to carry the cloth to be tentered.

D is a driving-shaft mounted in suitable bearings $d\,d$, and on this driving-shaft are the fast and loose pulleys $d'\,d^2$. (Shown clearly in Fig. 1.)

E E' are two shafts extending to the center of the machine and coupled there by a sleeve $E^2$. (Shown clearly in Fig. 3.) On the shaft E is a chain-wheel $e$ and on the shaft E' is a chain-wheel $e'$. The chains B B' pass around and are engaged by the sprockets on their respective chain-wheels, as clearly shown in Fig. 1.

On the shaft E is an eccentric gear-wheel F, engaging with an eccentric gear-wheel G loose on the shaft D, and also secured to the shaft E is a plain gear-wheel H, gearing with the plain gear-wheel I, also loose on the shaft D, and between the gear-wheels G and I and splined to the shaft is a clutch-sleeve J, adapted to engage with the teeth on the hub of the eccentric gear G or the plain gear I, so that on operating the lever $j$ the clutch can be thrown into center position and out of gear with either of the wheels G or I, or may be thrown into gear with the eccentric gear, which will drive the chain B at a variable speed, or moved into gear with the wheel I, which would drive the chain B at a uniform speed. This combination of gears is duplicated on the opposite side of the machine in connection with the shaft E', on which is an eccentric gear F' and a plain gear H', and on the shaft D is an eccentric gear G' and a plain gear I', both of these gears being loose on the shaft and between the gears is a clutch-sleeve J', operated by a lever $j'$. I preferably connect the two levers $j$ and $j'$ by a rod $j^2$, so that the gears on each side of the machine will be clutched to the shaft in unison.

It will be noticed that the eccentric gears on one side of the machine are so set in relation to the eccentric gears on the opposite side of the machine that during the time that the shaft E is traveling quickly the shaft E' is traveling slowly, so that the speed of one chain carrying one side of the cloth will be accelerated, while the speed of the chain carrying the opposite side of the cloth will be diminished. Consequently the cloth will be longitudinally stretched first by pulling on one side and then on the other, accomplishing the desired effect that has heretofore been accomplished only by mounting the shaft carrying the chain-wheels in movable bearings.

By my invention the ordinary machines now in use can be readily altered and the objectionable movable bearing entirely dispensed with.

The machine can readily tenter the cloth in the ordinary manner by throwing into gear with the shaft D the plain gearing, which will simply feed both edges of the cloth uniformly at a given speed.

As shown in Fig. 4, a machine may be made with only the eccentric gearing, dispensing entirely with the clutches where a special machine of this character is required, and instead of using the eccentric gears, differential chain-wheels may be used, as shown in Fig. 5, around which a chain belt may pass, giving the desired result.

I claim as my invention—

The combination in a machine for tentering cloth, or other fabrics, of the chains or belts for carrying the cloth, two independent shafts one at each side of the machine, belt wheels over which the cloth belts pass, eccentric gears mounted on each shaft, plain gears also mounted on said shafts, a driving shaft having eccentric and plain gears meshing with the eccentric and plain gears on the driven shaft, and clutches for throwing either set of gears into operation.

In testimony whereof I have signed my name to this specification in the presence of two subscribing witnesses.

R. J. WALKER.

Witnesses:
    WILL A. BARR,
    JOS. H. KLEIN.